(No Model.)
G. R. FULLER.
JOINT FOR ARTIFICIAL LIMBS.
No. 370,774.  Patented Oct. 4, 1887.
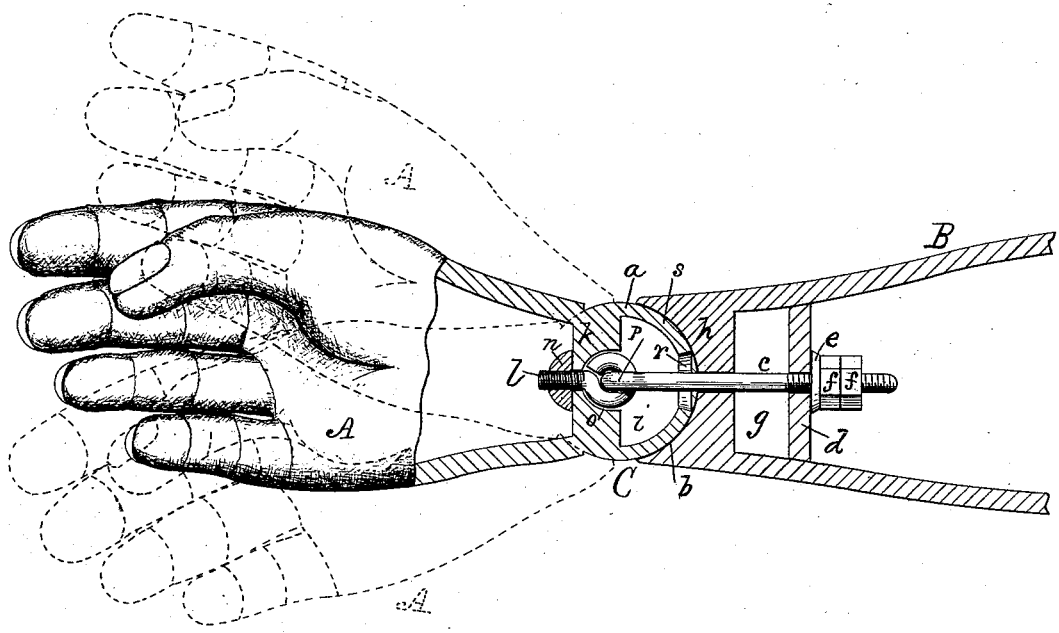
Attest
M. L. McDermott.
L. E. Whitmore.
Inventor:
Geo. R. Fuller.
By E. B. Whitmore Atty.

UNITED STATES PATENT OFFICE.

GEORGE R. FULLER, OF ROCHESTER, NEW YORK.

JOINT FOR ARTIFICIAL LIMBS.

SPECIFICATION forming part of Letters Patent No. 370,774, dated October 4, 1887.

Application filed March 26, 1887. Serial No. 232,458. (No model.)

*To all whom it may concern:*

Be it known that I, GEORGE R. FULLER, of Rochester, in the county of Monroe and State of New York, have invented a new and useful Improvement in Joints for Artificial Limbs, which improvement is fully set forth in the following specification, and shown in the accompanying drawing.

The object of my invention is to produce an improved wrist-joint for an artificial hand, the same being hereinafter fully described, and more particularly pointed out in the claim.

Referring to the drawing, the figure shows a view taken of the inside of a right hand and a portion of the arm, the latter with the wrist-joint and a portion of the hand being centrally longitudinally sectioned, the hand being shown in three positions by full and dotted lines.

I join the hand A to the arm B by a ball-and-socket joint, C, similar in some respects to those heretofore used, by means of which the hand has a universal movement upon the arm, the joint allowing also a twisting or rolling of the hand upon its axis. The ball $a$ of the joint is made rigid with or a part of the hand, and fitted to turn in a spherical socket, $b$, formed in the end of the arm. An axial eyebolt, $c$, is caused to pass longitudinally through the timber $h$ at the end of the arm, and through a spring cross bar, $d$, within the arm at right angles with the bolt. The bolt is threaded and provided with a washer, $e$, and set-nuts $ff$ on the outside of the spring-bar. A space, $g$, is left between the spring-bar and the part $h$ for the purpose of lightness and to give the bar an opportunity to spring or yield at its center in a line corresponding with the axis of the bolt.

The ball is formed with a hemispherical concentric cavity, $i$, and a strong internal bar, $k$, through which a short eyebolt, $l$, passes, the same being held by a nut, $n$, on the outside of the bar. The heads or eye portions of the bolts $c$ and $l$ lock, as shown, the axes of the two bolts forming a straight line when the wrist-joint is not deflected. The bar $k$ is formed with an internal concentric cavity, $o$, in which to receive the head of the bolt $l$. The parts being in place are drawn together by tightening the nuts $ff$. The point of contact or bearing-point $p$ between the two bolts at their eyes is exactly at the center of the ball or sphere, so that the longitudinal strain or pull upon the bolts remains constant while the hand is moved to any position relative to the arm the bolts always occupying positions radial to the sphere. A circular radial opening, $r$, is formed in the hemispherical shell $s$ of the ball around the bolt $c$, so that said bolt where it passes through said shell shall not interfere with the turning of the ball in the socket. This opening also serves as a space through which to allow the short eyebolt to be passed to its place within the ball.

Set-nuts like those shown at $ff$ may be provided for the eyebolt $l$, instead of the single nut $n$, if found desirable, and a yielding or spring washer may be placed between them and the bar $k$, and a similar spring-washer may be substituted for the washer $e$, should these be found to add a desirable elasticity to the joint.

One or the other or both of the tie-bolts $c$ and $l$ are fitted so as to turn in their bearings in the hand and arm, so that the hand may be rolled or turned upon its axis when occupying any position relative to the arm.

What I claim as my invention is—

An artificial hand formed with a spherical part at the wrist, in combination with an arm having a corresponding spherical socket, tie-bolts to hold said hand and arm together, joined in a flexible joint at the center of said spherical part of the hand, a spring-bar in said arm pierced by one of said bolts, and screw-nuts for said bolts, substantially as shown.

GEO. R. FULLER.

Witnesses:
E. B. WHITMORE,
M. L. McDERMOTT.